United States Patent
Chen et al.

(10) Patent No.: US 10,767,974 B1
(45) Date of Patent: Sep. 8, 2020

(54) WIDE RANGE OPTICAL WAVELENGTH FAST DETECTION FOR NARROWBAND SIGNAL

(71) Applicant: Rockwell Collins, Inc., Cedar Rapids, IA (US)

(72) Inventors: Wenlu Chen, Clarksville, MD (US); Oliver S. King, Frederick, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/709,613

(22) Filed: Dec. 10, 2019

(51) Int. Cl.
*G01B 9/02* (2006.01)
*G02F 1/225* (2006.01)
*H04B 10/67* (2013.01)
*H04J 14/02* (2006.01)
*H04B 10/50* (2013.01)
*H04B 10/556* (2013.01)
*H04L 27/20* (2006.01)

(52) U.S. Cl.
CPC ......... *G01B 9/02091* (2013.01); *G02F 1/225* (2013.01); *H04B 10/677* (2013.01); *H04B 10/505* (2013.01); *H04B 10/5561* (2013.01); *H04J 14/02* (2013.01); *H04L 27/2096* (2013.01)

(58) Field of Classification Search
CPC . G02F 1/225; G01B 9/02091; H04B 10/5561; H04B 10/677
See application file for complete search history.

(56) References Cited

U.S. PATENT DOCUMENTS

| 5,361,130 | A | 11/1994 | Kersey et al. | |
| 7,315,575 | B2 * | 1/2008 | Sun | H04B 10/2572 375/229 |
| 7,327,961 | B2 | 2/2008 | Griffin | |
| 7,460,793 | B2 * | 12/2008 | Taylor | H04B 10/61 398/202 |

(Continued)

FOREIGN PATENT DOCUMENTS

| WO | 2014194940 A1 | 12/2014 |
| WO | 2016043850 A3 | 3/2016 |

OTHER PUBLICATIONS

Guan, Hang et al., "Compact and low loss 90° optical hybrid on a silicon-on-insulator platform", Optics Express, vol. 25, No. 23, Nov. 13, 2017, pp. 28957-28968.

Primary Examiner — Daniel Petkovsek
(74) Attorney, Agent, or Firm — Suiter Swantz pc llo

(57) ABSTRACT

A wavelength detection system may include one or more wavelength detection stages configured to receive at least a portion of an input light signal, where each stage may include a splitter to split a portion of the input light signal into two arms, a 90-degree optical hybrid, and two differential detectors configured to generate I-channel and Q-channel differential signals based on the outputs from the 90-degree optical hybrid. Further, a free spectral range is associated with an optical path length difference between the two arms of each stage. The system may further include a logic device to receive at least one set of detection signals including I and Q channel differential signals associated with different free spectral ranges and determine the wavelength of the input light signal based on an arctangent of a ratio of the Q-channel and I-channel differential signals for at least one set of detection signals.

15 Claims, 13 Drawing Sheets

(56) References Cited

U.S. PATENT DOCUMENTS

| | | | | |
|---|---|---|---|---|
| 7,826,752 B1 * | 11/2010 | Zanoni | ............... | H04B 10/5055 |
| | | | | 398/186 |
| 7,941,058 B2 * | 5/2011 | Ohm | ................... | H04B 10/677 |
| | | | | 398/202 |
| 8,971,677 B2 * | 3/2015 | Sakamaki | .......... | G02B 6/12004 |
| | | | | 385/31 |
| 9,020,367 B2 * | 4/2015 | Jones | .................... | H04L 27/223 |
| | | | | 398/208 |
| 9,077,454 B2 * | 7/2015 | Li | ......................... | H04B 10/60 |
| 9,374,260 B2 | 6/2016 | Wen et al. | | |
| 10,033,477 B2 | 7/2018 | Bratkovski et al. | | |
| 10,205,535 B1 * | 2/2019 | Baehr-Jones | ........... | H04J 14/06 |
| 2008/0145066 A1 * | 6/2008 | Hoshida | ................ | H04B 10/63 |
| | | | | 398/205 |

* cited by examiner

WIDE RANGE OPTICAL WAVELENGTH FAST DETECTION FOR NARROWBAND SIGNAL

BACKGROUND

Optical wavelength detection of narrowband signals (e.g., optical signals having a narrow bandwidth of wavelengths) is widely useful for many applications including, but not limited to, optical sensing and metrology. For example, optical sensors based on Bragg gratings may output a narrowband optical signal where the wavelength is directly related to a measured property of interest. Such sensors may be utilized by detecting the wavelength of the output light and correlating the wavelength to the property of interest based on a calibration curve, a lookup table, one or more calculations, or any other desired technique. Further, it is desirable in many applications to achieve fast and accurate wavelength detection over a wide optical wavelength range.

SUMMARY

In one aspect, embodiments of the inventive concepts disclosed herein are directed to a wavelength detection system including one or more wavelength detection stages configured to receive at least a portion of an input light signal and a logic device. Each wavelength detection stage may include a splitter to split a portion of the input light signal into two arms, where a free spectral range associated with the respective wavelength detection stage is associated with an optical path length difference between the two arms. Each wavelength detection stage may also include a 90-degree optical hybrid accepting light from the two arms and providing two in-phase channel outputs and two quadrature channel outputs. Each wavelength detection stage may also include two differential detectors to generate an I-channel differential signal based on a difference between light from the two in-phase channel outputs and generate a Q-channel differential signal based on a difference between light from the two quadrature channel outputs. The logic device may receive one or more sets of detection signals, where each of the one or more sets of detection signals includes an I-channel differential signal and a Q-channel differential signal from one of the one or more wavelength detection stages, and where each of the one or more sets of detection signals is associated with a different free spectral range. The logic device may further determine a wavelength of the input light signal based on an arctangent of a ratio of the Q-channel and I-channel differential signals for each of one or more sets of detection signals.

In another aspect, embodiments of the inventive concepts disclosed herein are directed to a wavelength detection method. The method may include receiving at least a portion of an input light signal to one or more wavelength detection stages. Each wavelength detection stage may include a splitter to split a portion of the input light signal into two arms, where a free spectral range associated with the respective wavelength detection stage is associated with an optical path length difference between the two arms. Each wavelength detection stage may also include a 90-degree optical hybrid accepting light from the two arms and providing two in-phase channel outputs and two quadrature channel outputs. Each wavelength detection stage may also include two differential detectors to generate an I-channel differential signal based on a difference between light from the two in-phase channel outputs and generate a Q-channel differential signal based on a difference between light from the two quadrature channel outputs. The method may also include receiving, with a logic device, one or more sets of detection signals, where each of the one or more sets of detection signals includes an I-channel differential signal and a Q-channel differential signal from one of the one or more wavelength detection stages, and where each of the one or more sets of detection signals is associated with a different free spectral range. The method may also include determining a wavelength of the input light signal based on an arctangent of a ratio of the Q-channel and I-channel differential signals for each of one or more sets of detection signals.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
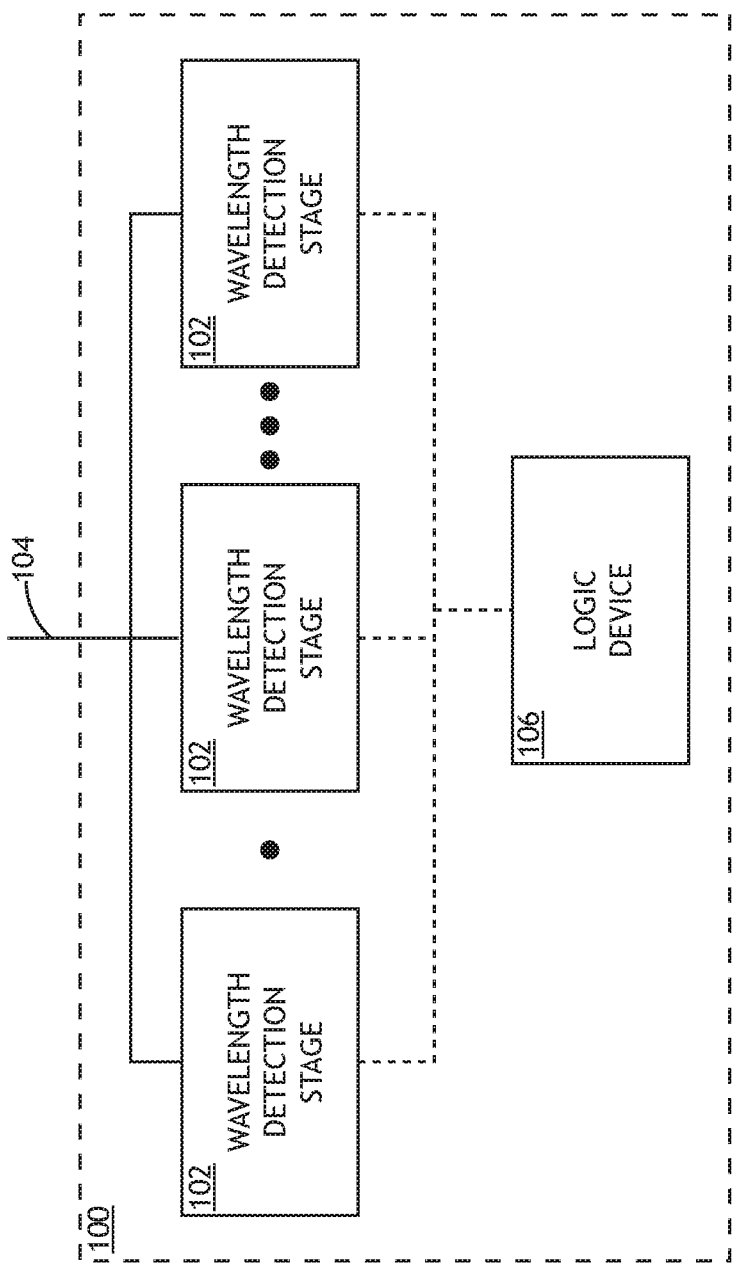
FIG. 1 is a block-diagram view of a wavelength detection system in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein are directed to passive optical wavelength detection using an unbalanced interferometer with a 90-degree optical hybrid providing in-phase and quadrature signals, where the optical wavelength of an input beam is linearly proportional to the arctangent of the ratio of the in-phase and quadrature signals. It is contemplated herein that wavelength detection based directly on an arctangent operation of two signals may be achieved using relatively low-cost components and may further provide fast, accurate and robust measurements without the need to perform spectrum scanning or Fast Fourier Transform (FFT) operations. Additionally, such a system may be flexibly implemented using in a variety of platforms including, but not limited to, as a photonic integrated circuit platform, a fiber-based platform, a free-space platform, or a combination thereof.

In some embodiments, a wavelength detection stage includes an unbalanced interferometer combined with a 90-degree optical hybrid. It is recognized herein that a 90-degree optical hybrid may accept two optical signals as inputs and may provide four output signals in which a first signal is mixed with four quadrature states of a second signal. In particular, the four outputs may include two in-phase outputs and two quadrature outputs. In some embodiments, input light (e.g., an input light signal) is directed to an unbalanced interferometer having an optical path length difference (OPD) between the two arms, and the outputs from each arm of an unbalanced interferometer are provided as inputs to a 90-degree optical hybrid. In this configuration, a differential signal between the in-phase outputs of the 90-degree optical hybrid (e.g., an in-phase differential signal) may be represented as a sinusoidal function (e.g., a cosine function) with a period based on the wavelength of the input light and the OPD of the interferometer. A differential signal between the quadrature outputs of the 90-degree optical hybrid (e.g., a quadrature differential signal) may be similarly represented as a sinusoidal function with the same period, but 90 degrees out of phase with the in-phase differential signal. Accordingly, the wavelength of the input light will be linearly proportional to the arctangent of the ratio of the in-phase differential signal and the quadrature differential signal.

A wavelength detection stage configured in accordance with the present disclosure may have a free spectral range (FSR) equal to the period of the in-phase and quadrature differential signals, which is based on the OPD of the interferometer. As a result, the operational range of a wavelength detection stage may be controlled, adjusted, or otherwise selected based on the OPD of the interferometer for an expected range of input wavelengths.

In some embodiments, a wavelength detection system may include multiple wavelength detection stages, each having a different OPD and thus a different free spectral range. It is recognized herein that a slope of the arctangent of the ratio of the in-phase differential signal and the quadrature differential signal as a function of wavelength will be linear within a spectral window associated with the free spectral range. Accordingly, the slope of this linear signal as a function of wavelength, which may be related to the sensitivity and/or resolution of the wavelength detection, may be inversely related to the free spectral range. Multiple wavelength detection stages based on multiple free spectral ranges may thus provide measurements with different sensitives.

In some embodiments, multiple wavelength detection stages are combined to provide high detection sensitivity across a wide operational range. For example, a two-stage wavelength detection system may provide an operational range based on the stage having the larger free spectral range with the sensitivity based on the stage with the smaller free spectral range. It is contemplated herein that a wavelength detection system may have any number of stages to provide a selected combination of sensitivity and spectral range.

Multiple wavelength detection stages may be implemented using multiple configurations within the spirit and scope of the present disclosure. In some embodiments, input light is split or otherwise directed to multiple wavelength detection stages that operate in parallel. In some embodiments, a wavelength stage includes an adjustable optical delay line to selectively adjust the OPD and thus selectively adjust the free spectral range of the stage. In this regard, a single wavelength detection stage may sequentially generate detection signals based on multiple OPDs.

Referring now to FIG. 1, a block-diagram view of a wavelength detection system 100 in accordance with an embodiment of the inventive concepts disclosed herein is shown.

In some embodiments, a wavelength detection system 100 includes one or more wavelength detection stages 102, where each wavelength detection stage 102 provides a series of in-phase and quadrature output signals that are related to the wavelength of input light 104 into the wavelength detection system 100 within a certain free spectral range, or operational range. As illustrated in FIG. 1, the wavelength detection system 100 may include any number of wavelength detection stages 102, each having different free spectral ranges. Further, it is to be understood that although the wavelength detection stages 102 are depicted as separate blocks in FIG. 1, any wavelength detection stage 102 may be implemented as a discrete component or as a configuration of an adjustable wavelength detection stage 102. For example, as described previously herein, an adjustable wavelength detection stage 102 may include an adjustable optical delay line to selectively adjust the OPD and thus selectively adjust the free spectral range. In this regard, a single physical component may operate as multiple wavelength detection stages 102.

In some embodiments, the wavelength detection system 100 includes a logic device 106 communicatively coupled to each of one or more wavelength detection stages 102 to generate an output signal indicative of the wavelength of the input light 104 based on the outputs of the wavelength detection stages 102.

The logic device 106 may be any type of logic device suitable for generating an output signal indicative of the wavelength of the input beam based on signals from the wavelength detection stages 102.

In some embodiments, the logic device 106 includes one or more field-programmable gate arrays (FPGAs). In some embodiments, the logic device 106 includes a controller communicatively coupled to one or more processors. In another embodiment, the one or more processors are configured to execute a set of program instructions maintained in a memory medium, or memory. Further, the controller may include one or more modules containing one or more program instructions stored in the memory medium executable by the processors. The processors of a controller may include any processing element known in the art. In this sense, the logic device 106 may include any microprocessor-type device configured to execute algorithms and/or instructions. In one embodiment, the logic device 106 includes a digital signal processor. In another embodiment, the processors includes a desktop computer, mainframe computer system, workstation, image computer, parallel processor, or any other computer system (e.g., networked computer) configured to execute the various processing steps described throughout the present disclosure. It is further recognized that the term "processor" may be broadly defined to encompass any device having one or more processing elements, which execute program instructions from a non-transitory memory medium.

The memory medium may include any storage medium known in the art suitable for storing program instructions executable by the associated processors. For example, the memory medium may include a non-transitory memory medium. As an additional example, the memory medium may include, but is not limited to, a read-only memory, a random-access memory, a magnetic or optical memory device (e.g., disk), a magnetic tape, a solid state drive and the like. It is further noted that memory medium may be housed in a common controller housing with the processors. In one embodiment, the memory medium may be located remotely with respect to the physical location of the processors and/or controller. For instance, the processors may access a remote memory (e.g., server), accessible through a network (e.g., internet, intranet and the like). Therefore, the above description should not be interpreted as a limitation on the present invention but merely an illustration.

Figure 2A:
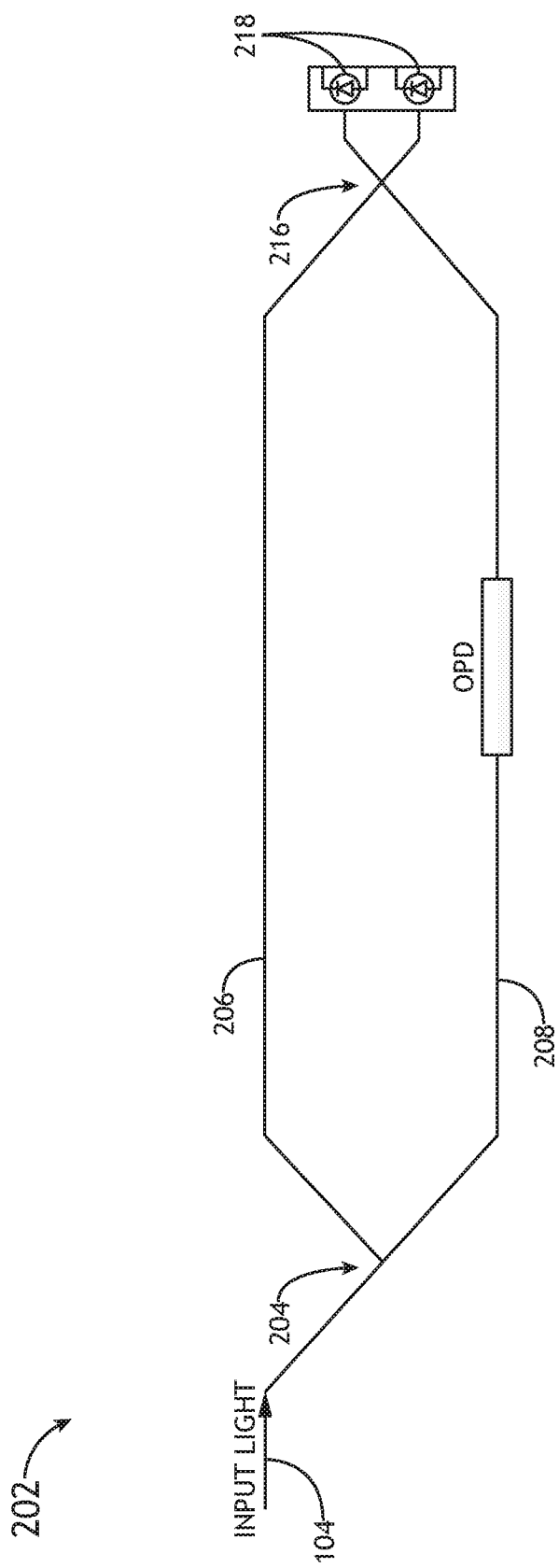
FIG. 2A is a conceptual view of a wavelength detection stage including an unbalanced interferometer configured in accordance with an embodiment of the inventive concepts disclosed herein.

Referring now to FIG. 2A, a conceptual view of a wavelength detection stage 102 including an unbalanced interferometer 202 configured in accordance with an embodiment of the inventive concepts disclosed herein is shown. As described previously herein, an unbalanced interferometer 202 may include an input port splitter 204 to split input light 104 into a first arm 206 and a second arm 208, where the optical paths of the first arm 206 and the second arm 208 differ to provide an optical path length difference (OPD) between the two arms. For example, the OPD may be represented as:

$$OPD = (L \cdot n) \quad (1)$$

where L is physical path length and n is the refractive index.

The splitter 204 may include any type of optical splitter known in the art suitable for evenly splitting the input light 104 between the first arm 206 and the second arm 208 such as, but not limited to, a 50/50 splitter, a wideband optical directional coupler, or the like. The unbalanced interferometer 202 may further include a coupler 210 (e.g., an optical directional coupler) to combine light from the first arm 206 and the second arm 208 and provide two output signals.

The OPD between the two arms may be generated by any technique known in the art. Further, a wavelength detection stage 102 may include an unbalanced interferometer 202 with a fixed OPD between the two respective arms or may include one or more components for adjusting or otherwise controlling the OPD. In one embodiment, at least one wavelength detection stage 102 includes an unbalanced interferometer 202 with a fixed OPD. For example, at least one wavelength detection stage 102 may include an unbalanced interferometer 202 with a fixed physical path length difference (ΔL) between the first arm 206 and the second arm 208.

Figure 2B:
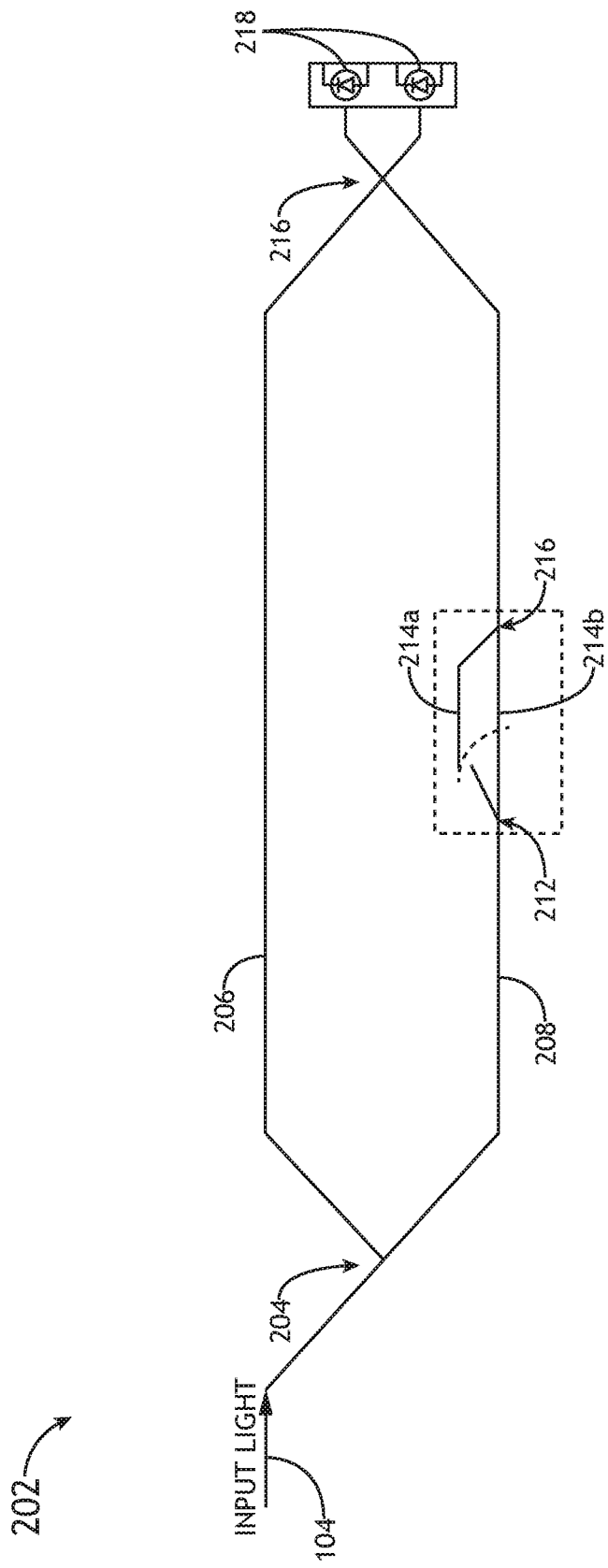
FIG. 2B is a conceptual view of a wavelength detection stage including wavelength detection stage with an adjustable unbalanced interferometer configured in accordance with an embodiment of the inventive concepts disclosed herein.

In another embodiment, at least one wavelength detection stage 102 may include an unbalanced interferometer 202 with one or more components forming an adjustable optical delay line to adjust the phase of one arm with respect to the other to provide an adjustable OPD. For example, an adjustable optical delay line may be formed from an optical phase modulator (e.g., a Pockels cell, or the like) that may adjust the index of refraction for a portion of one arm based on an applied electric field. By way of another example, an adjustable optical delay line may include a series of optical switches and couplers to selectively adjust the optical path of light through at least one of the arms. FIG. 2B is a conceptual view of a wavelength detection stage 102 including wavelength detection stage 102 with an adjustable unbalanced interferometer 202 configured in accordance with an embodiment of the inventive concepts disclosed herein. As illustrated in FIG. 2B, the adjustable delay line may be formed from an optical switch 212 in the second arm 208 to selectively direct light into one of two paths 214a,b having different optical path lengths and a coupler 216 to recombine light from the two paths 214a,b. In this regard, the OPD between the first arm 206 and the second arm 208 may be adjusted by selecting the path (e.g., either of paths 214a,b) with the optical switch 212. Additionally, although not shown, it is contemplated herein that the adjustable optical delay line may be formed from multiple switches to provide a selected number of possible OPD values.

The photocurrent at the two outputs of the coupler 210, as measured by photodiodes 218 (e.g., balanced photodiodes 218), may be characterized as:

$$\begin{bmatrix} i_1 \\ i_2 \end{bmatrix} = \begin{bmatrix} E_1 & E_1^* \\ E_2 & E_2^* \end{bmatrix} = \frac{\gamma}{4} E_{in}^2 \begin{bmatrix} (e^{-i\Delta\phi} - 1) & (e^{i\Delta\phi} - 1) \\ (e^{-i\Delta\phi} + 1) & (e^{i\Delta\phi} + 1) \end{bmatrix} \quad (2)$$

$$\begin{bmatrix} i_1 \\ i_2 \end{bmatrix} = \frac{\gamma}{2} E_{in}^2 \begin{bmatrix} 1 - \cos[\Delta\phi] \\ 1 + \cos[\Delta\phi] \end{bmatrix} \quad (3)$$

$$E_{in} = \sqrt{P_{in}} \, e^{-i\omega t} \quad (4)$$

$$\Delta\phi = 2\pi \frac{OPD}{\lambda}, \quad (5)$$

where $i_1$ and $i_2$ are the photocurrents at the photodiodes 218, $E_1$ is the electric field at the end of the first arm 206, $E_2$ is the electric field at the end of the second arm 208, $E_{in} = \sqrt{P_{in}} e^{-i\omega t}$ is the electric field of the input light 104, $P_{in}$ is the optical power of the input light 104, co is the optical angular frequency of the input light 104, A is the wavelength of the input light 104, t is time, and y is the responsivity of the photodiodes 218.

Taking a differential measurement of the photocurrents $i_1$ and $i_2$ with a pair of balanced photodiodes 218 then provides:

$$i_2 - i_1 = \gamma E_{in}^2 \cos\left(2\pi \frac{OPD}{\lambda}\right). \quad (6)$$

Accordingly, the differential output is a sinusoidal function having a period related to both the wavelength of the input light 104 (the parameter of interest) and the OPD between first arm 206 and the second arm 208.

Figure 3:
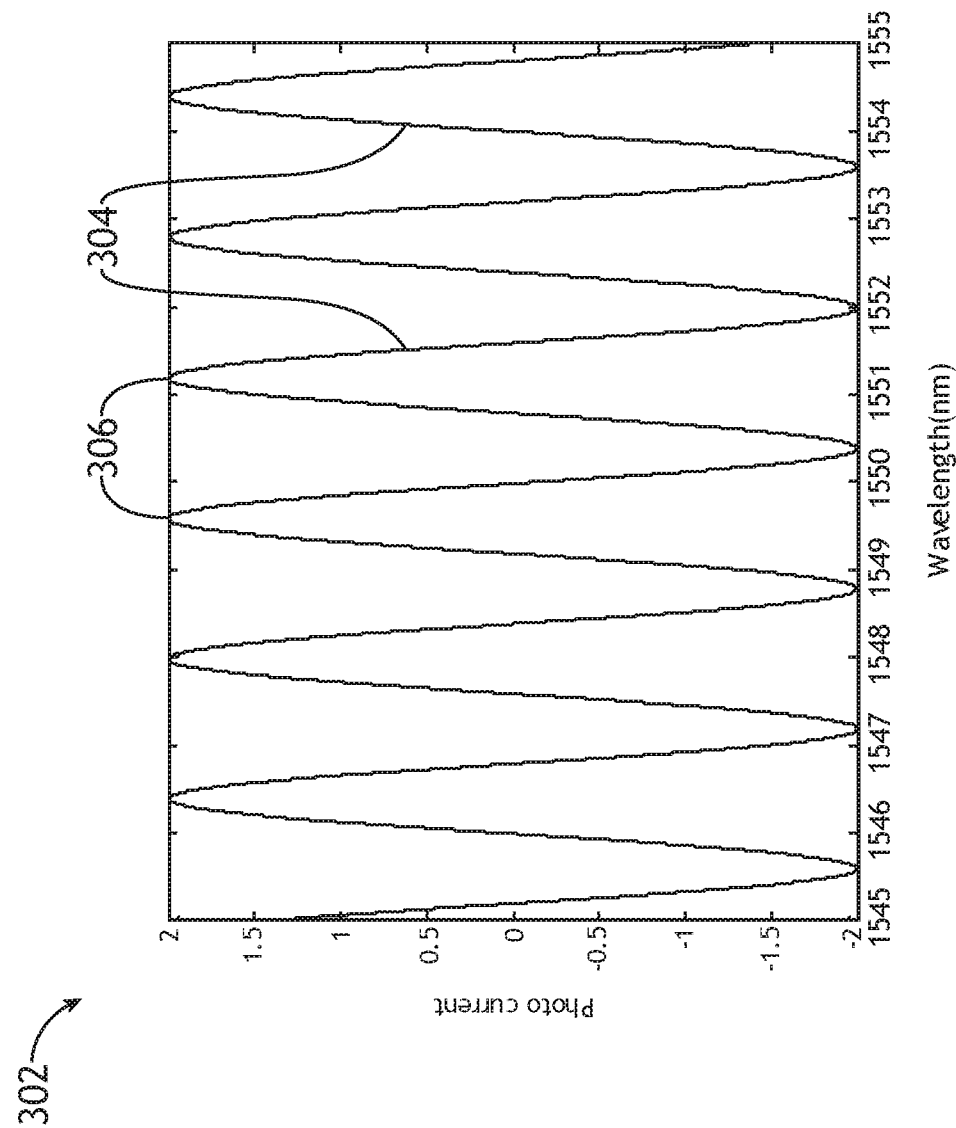
FIG. 3 is a plot of the differential measurement of the photocurrents $i_1$ and $i_2$ of the unbalanced interferometer of FIG. 2A in accordance with an embodiment of the inventive concepts disclosed herein.

FIG. 3 is a plot 302 of the differential measurement of the photocurrents $i_1$ and $i_2$ of the unbalanced interferometer 202 of FIGS. 2A and 2B in accordance with an embodiment of the inventive concepts disclosed herein. The plot 302 is centered around a wavelength of 1550 nm, though it is to be understood that this wavelength is merely an illustration and should not be interpreted as limiting. Further, the plot 302 illustrates the sinusoidal dependence of the differential photocurrent on the wavelength of the input light 104. It is contemplated herein that regions 304 between the peaks 306 of the differential photocurrent may be approximately linear and may be suitable for wavelength determination in the selected regions 304. However, it may be undesirable to restrict wavelength determination to the selected regions 304.

Figure 4A:
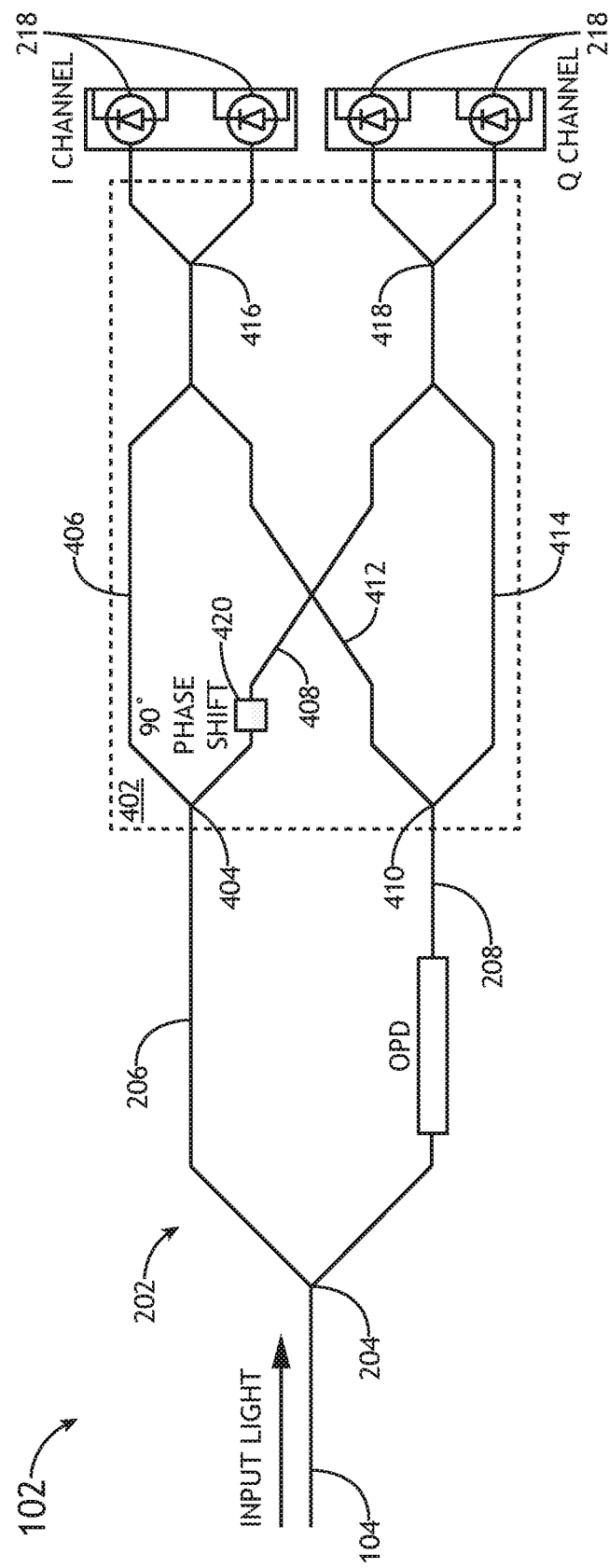
FIG. 4A is a conceptual view of a wavelength detection stage including a portion of an unbalanced interferometer 202 and a 90-degree optical hybrid in accordance with an embodiment of the inventive concepts disclosed herein.

FIG. 4A is a conceptual view of a wavelength detection stage 102 including a portion of an unbalanced interferometer 202 and a 90-degree optical hybrid 402 in accordance with an embodiment of the inventive concepts disclosed herein. For example, the wavelength detection stage 102 may include the splitter 204, the first arm 206, and the second arm 208, but not the coupler 210 as illustrated in FIG. 2A. Rather, the coupler 210 may be replaced with the 90-degree optical hybrid 402 that accepts light from each arm of the unbalanced interferometer 202.

Figure 4B:
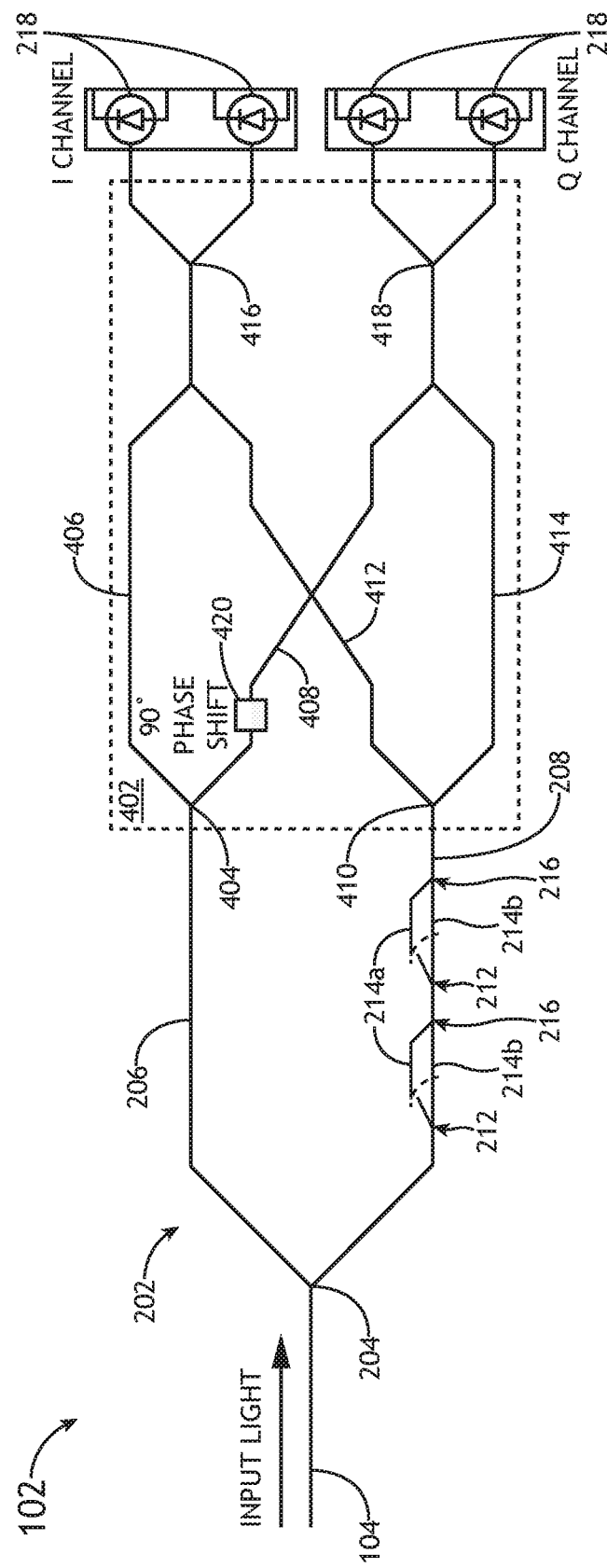
FIG. 4B is a conceptual view of a wavelength detection stage including wavelength detection stage with an adjustable unbalanced interferometer configured in accordance with an embodiment of the inventive concepts disclosed herein.

Further, as described with respect to FIGS. 2A and 2B, the unbalanced interferometer 202 of the wavelength detection stage 102 illustrated in FIG. 4A may provide a fixed or an adjustable OPD between the first arm 206 and the second arm 208. In one embodiment, at least one wavelength detection stage 102 includes an unbalanced interferometer 202 with a fixed OPD. For example, at least one wavelength detection stage 102 may include an unbalanced interferometer 202 with a fixed physical path length difference (ΔL) between the first arm 206 and the second arm 208. In another embodiment, at least one wavelength detection stage 102 may include an unbalanced interferometer 202 with one or more components forming an adjustable optical delay line to adjust the phase of one arm with respect to the other to provide an adjustable OPD. For example, as described previously herein, an adjustable optical delay line may be formed from an optical phase modulator, a series of optical switches and couplers, or the like. FIG. 4B is a conceptual view of a wavelength detection stage 102 including wavelength detection stage 102 with an adjustable unbalanced interferometer 202 configured in accordance with an embodiment of the inventive concepts disclosed herein. As illustrated in FIG. 4B, the adjustable delay line may be formed from multiple (e.g., two shown here) sets of switchable paths.

A wavelength detection stage 102 including a 90-degree optical hybrid 402 may accept light from each arm of an unbalanced interferometer 202 as inputs and may generate two in-phase signals and two quadrature signals as outputs based on mixing of the input light from each arm with various phase combinations.

In one embodiment, as illustrated in FIGS. 4A and 4B, a 90-degree optical hybrid 402 may include a first splitter 404 to equally split light from the first arm 206 into a first path 406 and a second path 408, and a second splitter 410 to equally split light from the second arm 208 into a third path 412 and a fourth path 414.

The 90-degree optical hybrid 402 may include a first coupler 416 to combine light from the first path 406 and the third path 412 (e.g., light from the first arm 206 and the second arm 208). Further, the 90-degree optical hybrid 402 may be configured to provide no optical phase difference for light in these paths. In this regard, the two outputs of the first coupler 416 may be characterized as in-phase outputs and may be described by the equations analogous to (2) and (3) above. The 90-degree optical hybrid 402 may additionally include a second coupler 418 to combine light from the second path 408 and the fourth path 414 (e.g., light from the first arm 206 and the second arm 208). Further, the 90-degree optical hybrid 402 may be configured to provide a 90-degree phase difference between the second path 408 and the fourth path 414 (illustrated in FIGS. 4A and 4B) by a 90-degree phase indicator 420 in the second path 408). In this regard, the two outputs of the second coupler 418 may be characterized as quadrature outputs.

It is contemplated herein that the 90-degree optical hybrid 402 in the present disclosure is not limited to the illustration provided in FIGS. 4A and 4B. Rather, the 90-degree optical hybrid 402 may have any design providing the in-phase and quadrature signals described herein without departing from the spirit and scope of the present disclosure.

In some embodiments, the wavelength detection stage 102 includes a balanced pair of photodiodes 218 for the in-phase outputs of the 90-degree optical hybrid 402 for the generation of an I-channel differential signal as well as a balanced pair of photodiodes 218 for the quadrature outputs of the 90-degree optical hybrid 402 for the generation of a quadrature-channel (Q-channel) differential signal. In this regard, the I-channel and Q-channel differential signals may be referred to as detection signals associated with a particular wavelength detection stage 102 having a particular FSR. For example, the I-channel differential signal ($i_I$) and the Q-channel differential signal ($i_Q$) may be described as:

$$i_I = \gamma E_{in}^2 \cos\left(2\pi \frac{OPD}{\lambda}\right) \quad (7)$$

$$i_Q = \gamma E_{in}^2 \sin\left(2\pi \frac{OPD}{\lambda}\right) \quad (8)$$

Figure 5:
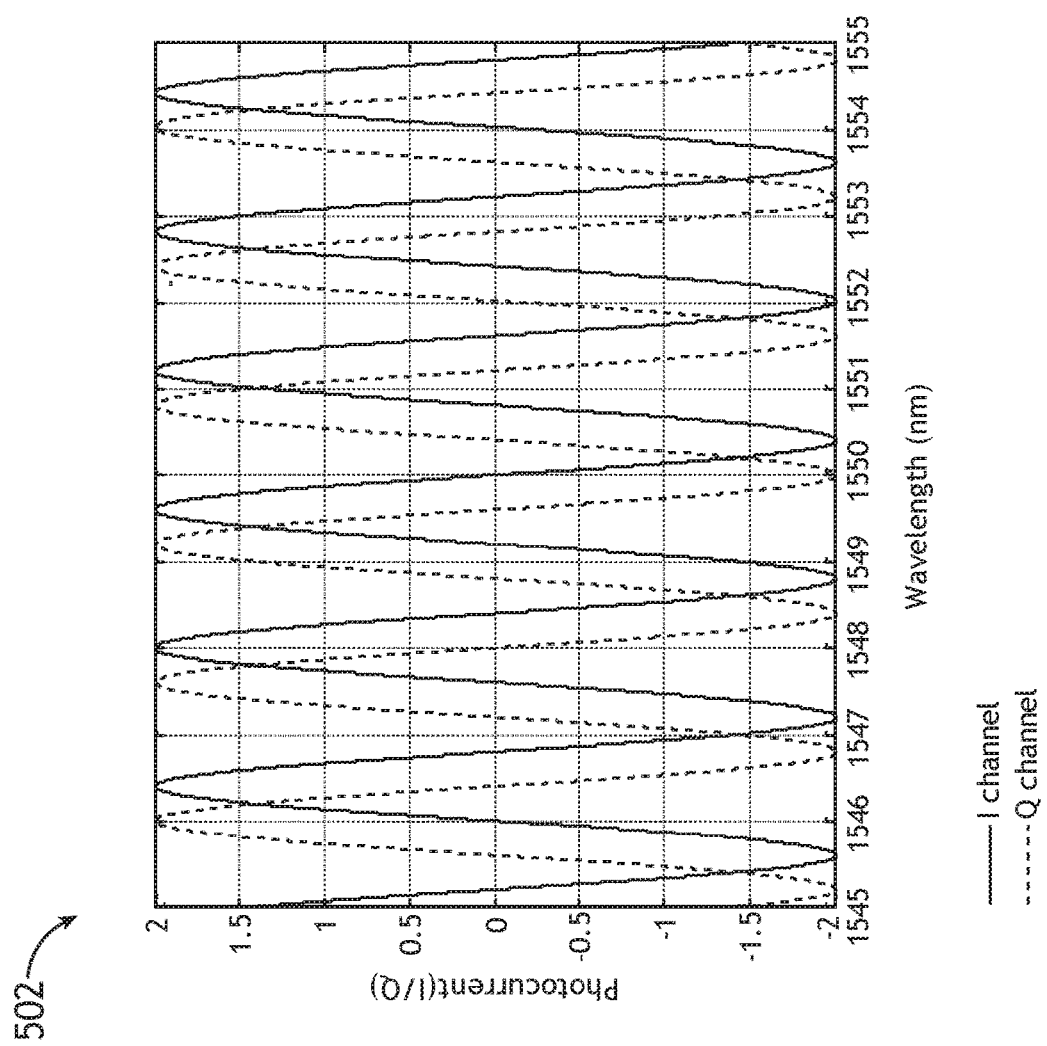
FIG. 5 is a plot of the I-channel and Q-channel differential outputs of a wavelength detection stage including a 90-degree optical hybrid of FIGS. 4A and 4B in accordance with an embodiment of the inventive concepts disclosed herein.

FIG. 5 is a plot 502 of the I-channel and Q-channel differential signals of a wavelength detection stage 102 including a 90-degree optical hybrid 402 of FIGS. 4A and 4B in accordance with an embodiment of the inventive concepts disclosed herein. As illustrated by equations (7) and (8), along with FIG. 5, the I-channel and Q-channel differential signals are both sinusoidal with a 90-degree phase-shift between them generated by the 90-degree optical hybrid 402. Further, as described with respect to the unbalanced interferometer 202 in FIGS. 2A and 2B, the period of the I-channel and Q-channel is related to the OPD between the first arm 206 and the second arm 208, as well as the wavelength of the input light 104.

It is contemplated herein that the arctangent of the ratio of the Q-channel and the I-channel differential signals (e.g., arctan($i_Q/i_I$)) is linear as a function of wavelength of the input light 104 within a periodic series of intervals corresponding to the period of the Q-channel and I-channel differential signals, which may be characterized as the free spectral range of the wavelength detection stage 102. Accordingly, the wavelength of the input light 104 may be readily determined based on the arctangent of the ratio of the Q-channel and the I-channel differential signals.

Figure 6:
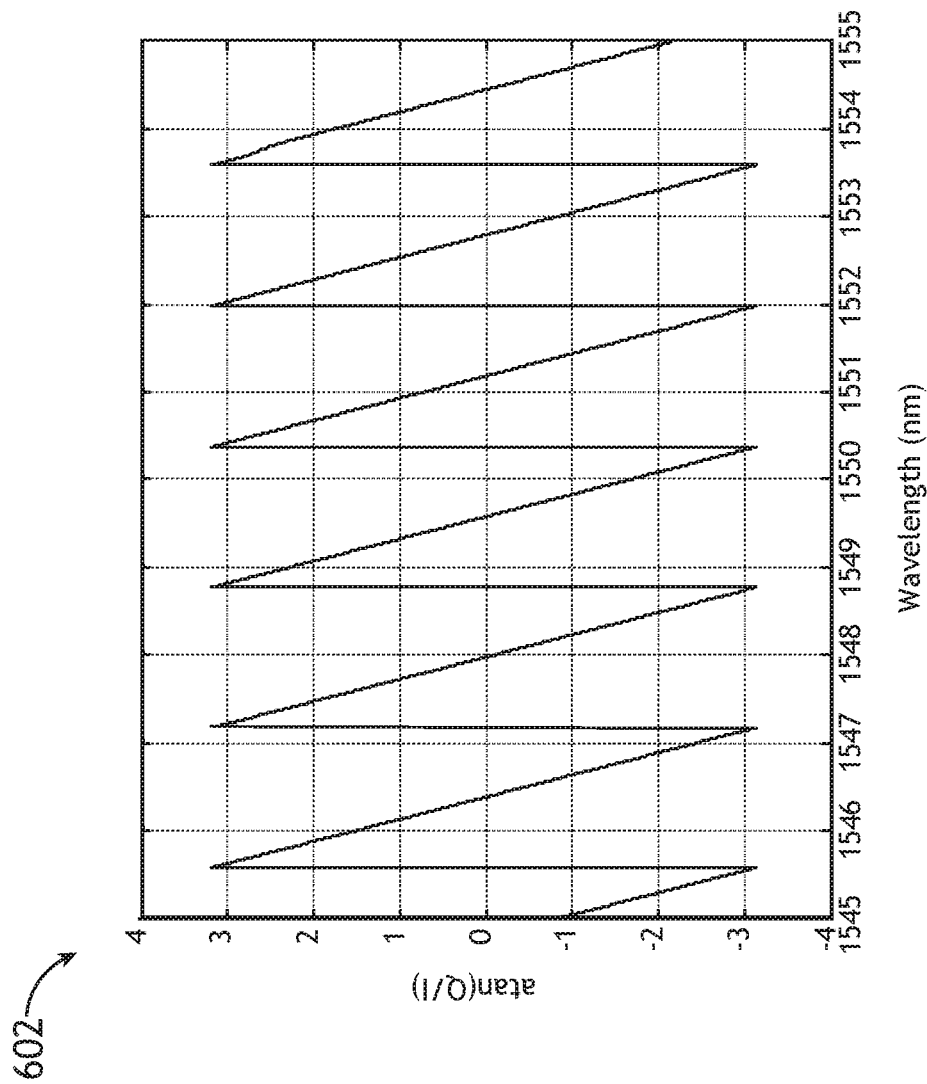
FIG. 6 is a plot of the arctangent of the ratio of the I-channel signal and the Q-channel signal as a function of the wavelength of the input light in accordance with an embodiment of the inventive concepts disclosed herein.

FIG. 6 is a plot 600 of the arctangent of the ratio of the Q-channel the I-channel differential signals (here arctan($i_Q/i_I$)) as a function of the wavelength of the input light 104 in accordance with an embodiment of the inventive concepts disclosed herein.

As illustrated in FIG. 6, arctan($i_Q/i_I$) is linear as a function of wavelength within a periodic series of intervals corresponding to the period of the Q-channel and I-channel differential signals corresponding to the free spectral range of the wavelength detection stage 102. Although not shown, a plot of arctan($i_I/i_Q$) is also linear within the free spectral range of the wavelength detection stage 102. Additionally, the arctangent of the ratio of the Q-channel the I-channel differential signals is linear as a function of the optical frequency of the input light 104. Accordingly, the I-channel and Q-channel differential signals may be sampled, stored, or otherwise characterized as a function of either the optical frequency or wavelength.

In some embodiments, the logic device 106 receives the I-channel and Q-channel differential signals from the photodiodes 218 associated with the wavelength detection stage 102 and calculates the arctangent of the ratio of the Q-channel and the I-channel differential signals (e.g., arctan($i_Q/i_I$) or arctan($i_I/i_Q$)), which is referred to herein as an arctangent signal. Further, the logic device 106 may provide any selected output signal equal to or indicative of the wavelength (or optical frequency) of the input light 104. In one embodiment, the logic device 106 may output the value of the arctangent signal, which is indicative of the wavelength (or optical frequency) of the input light 104. In another embodiment, the logic device 106 may determine and output a value of the wavelength or optical frequency of the input light 104 based on the arctangent signal.

It is contemplated herein that the free spectral range of a particular wavelength detection stage 102 having a particular OPD between the respective arms (e.g., the first arm 206 and the second arm 208 illustrated in FIGS. 2A and 2B) is effectively also the operational range of the wavelength detection stage 102 in this configuration. For example, if the wavelength of the input light 104 is limited to a range within the free spectral range (e.g., within a linear region in FIG. 6 ranging from values of −π to +π), the value of the arctangent signal may linearly map to the optical wavelength in this range.

It is further contemplated herein that the wavelength resolution of the wavelength detection stage 102 may be inversely related to the free spectral range of the wavelength detection stage 102. For example, the slope of each linear region in FIG. 6 is inversely related to the FSR since the value of the arctan($i_Q/i_I$) varies between from −π to +π within the free spectral range. Accordingly, the selection of the free spectral range of a wavelength detection stage 102, which is related to the OPD between the first arm 206 and the second arm 208 of the wavelength detection stage 102, may involve a tradeoff between the allowable wavelength range for input light 104 and the resolution of the wavelength detection stage 102 to shifts in the wavelength within this range.

In some embodiments, the wavelength detection system 100 may generate two or more sets of detection signals associated with different free spectral ranges or corresponding operational ranges. For example, each set of detection signals may include I-channel and a Q-channel differential signals from a particular wavelength detection stage 102 having a particular FSR. In this regard, the wavelength detection system 100 may provide various levels of sensitivity and operational range. For example, a wavelength detection system 100 including two sets of differential signals may provide a "coarse" wavelength measurement within a relatively large operational range and a "fine" wavelength measurement within a relatively short wavelength range.

The wavelength detection system 100 may be configured to generate multiple sets of differential signals with different free spectral ranges either simultaneously or sequentially. In some embodiments, a wavelength detection system 100 includes multiple wavelength detection stages 102 having different free spectral ranges (e.g., different OPDs between arms of the respective wavelength detection stages 102), where each wavelength detection stage 102 receives a portion of the input light 104 (e.g., from a beamsplitter, or the like). Accordingly, the logic device 106 may simultaneously receive the multiple sets of detection signals from the multiple wavelength detection stages 102. In some embodiments, the wavelength detection system 100 includes at least one wavelength detection stage 102 having an adjustable delay line to dynamically control the OPD between the respective arms and thus associated FSR. In this regard, the logic device 106 may sequentially receive multiple sets of detection signals with different free spectral ranges from a single a single wavelength detection stage 102. Further, any combination of sequential and simultaneous operation is within the spirit and scope of the present disclosure.

In some embodiments, the free spectral range of one set of detection signals is selected to be an integer multiple of the FSR of another set of detection signals. In this regard, the wavelength detection system 100 may effectively provide the operational range based on the longer FSR and a sensitivity (e.g., slope of the arctangent signal) based on the shorter FSR.

Figure 7:
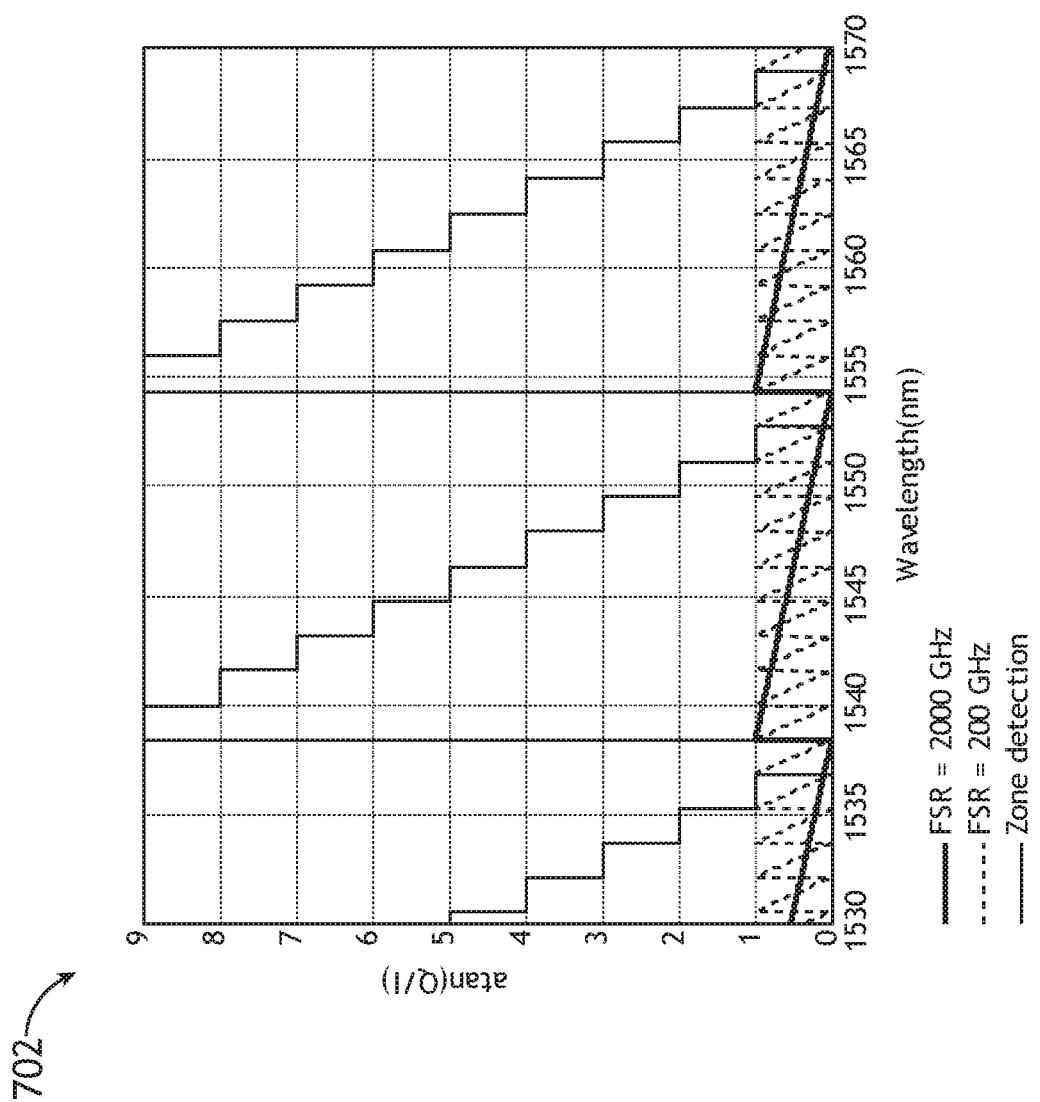
FIG. 7 is a plot of outputs of two wavelength detection stages scaled to values between 0 and 1, where a first wavelength detection stage has a free spectral range (FSR) of 200 GHz and a second wavelength detection stage has a FSR of 2000 GHz, in accordance with an embodiment of the inventive concepts disclosed herein.

FIG. 7 is a plot 702 of the arctangent signals (e.g., $\arctan(i_Q/i_I)$) for two sets of detection signals scaled to values between 0 and 1, where a first set of detection signals has a FSR of 200 GHz and a second set of detection signals has a FSR of 2000 GHz (e.g., 10× larger), in accordance with an embodiment of the inventive concepts disclosed herein.

As illustrated in FIG. 7, a particular value of the arctangent signal associated with the shorter FSR may correspond to any of a periodic sequence of wavelengths separated by the FSR. Further, the value of the arctangent signal may be linear in any of a periodic series of FSR "zones."

Further, the value of the arctangent signal associated with the longer FSR may be used to identify the appropriate spectral region, or "zone" such that the wavelength of the input light 104 may be determined within operational range associated with the longer FSR and the sensitivity (or slope of the arctangent signal) based on the shorter FSR.

In some embodiments, the arctangent signals associated with multiple sets of detection signals associated with different free spectral ranges are combined (e.g., by the logic device 106) to provide a single combined output signal indicative of the wavelength of the input light 104.

Figure 8:
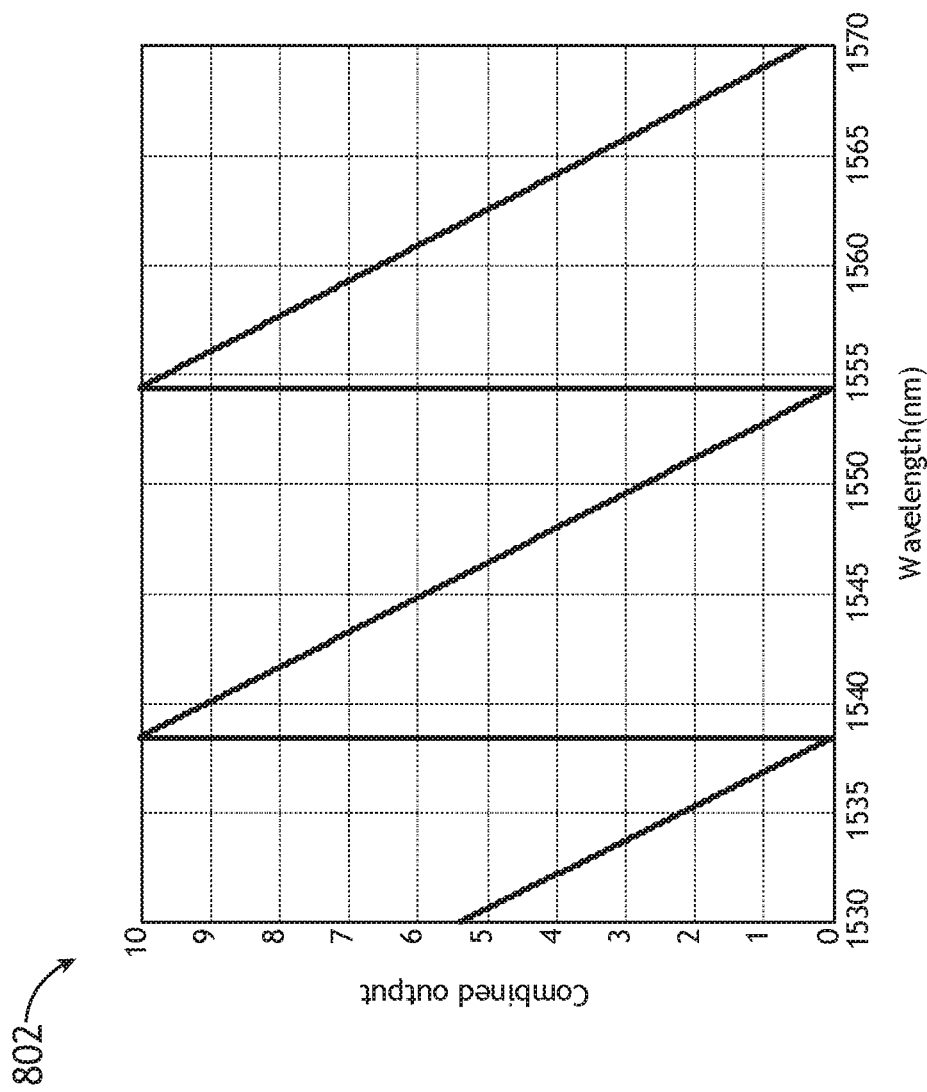
FIG. 8 is a plot illustrating a combined signal based on the two-stage wavelength detection system in FIG. 7 in accordance with an embodiment of the inventive concepts disclosed herein.

FIG. 8 is a plot 802 illustrating a combined output signal based on the two-stage wavelength detection system 100 in FIG. 7 in accordance with an embodiment of the inventive concepts disclosed herein. For example, a combined output ($O_c$) may be generated based on:

$$O_c = \text{floor}(N \cdot O_2) + O_1 \quad (9)$$

where $O_1$ is the value of the first arctangent signal associated with the first (smaller) FSR, $O_2$ is the value of the second arctangent signal associated with the second (longer) FSR, and N is is the ratio of the second FSR to the first FSR. As illustrated in FIG. 8, the combined output ($O_c$) is linearly proportional to the wavelength of the input light 104 across an operational range associated with the second FSR and a sensitivity (e.g., slope) associated with the first FSR.

It is further contemplated herein that the wavelength detection system 100 may include any number of wavelength detection stages 102 having any combination of fixed or adjustable OPDs, and thus any combination of free spectral ranges, to provide a selected sensitivity and operational range.

It is further contemplated herein that the wavelength detection system 100 may be formed from any suitable materials and in any form factor known in the art. In some embodiments, one or more wavelength detection stages 102 are formed as photonic integrated circuits. In some embodiments, one or more wavelength detection stages 102 are formed from fiber-based components. In some embodiments, one or more wavelength detection stages 102 are formed from free-space components.

It is contemplated herein that the performance of the wavelength detection system 100 may be impacted by the temperature and any fluctuations in temperature. In particular, the index of refraction of a material typically varies as a function of temperature, which may directly impact the OPD between two arms of a wavelength detection stage 102 and thus the FSR. For example, the thermo-optic coefficient ($\delta n/\delta T$) associated with a change in refractive index (n) with a change in temperature (T) for common semiconductor materials InP, GaAs, and 6H-SiC is generally described in F. G. Della Corte et al., "Temperature dependence of the thermo-optic coefficient of InP, GaAs, and SiC from room temperature to 600 K at the wavelength of 1.5 μm" Appl. Phys. Lett. 77, 1614 (2000), which is incorporated herein by reference in its entirety.

Figure 9:
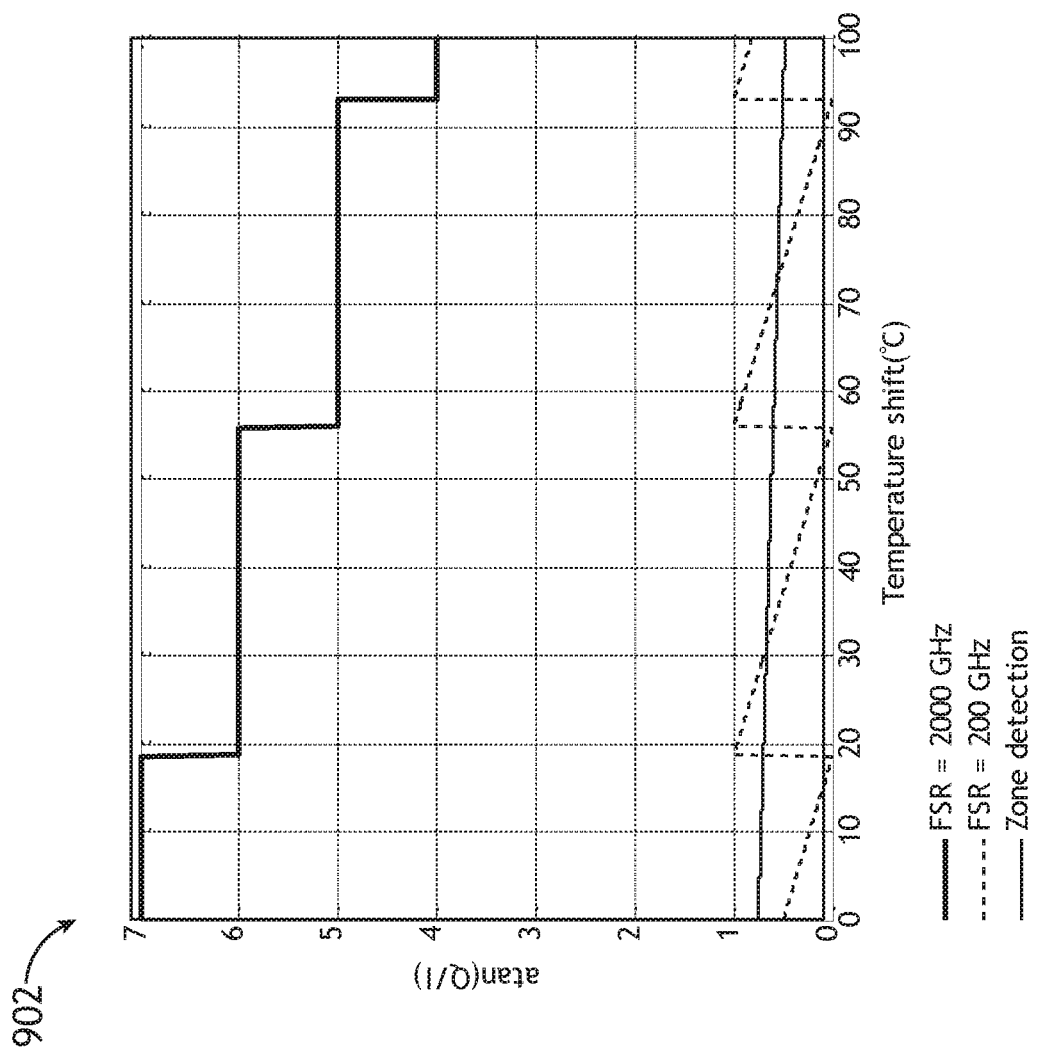
FIG. 9 is a plot of arctangent signals associated with FIG. 7 as a function of temperature in accordance with an embodiment of the inventive concepts disclosed herein.
Figure 10:
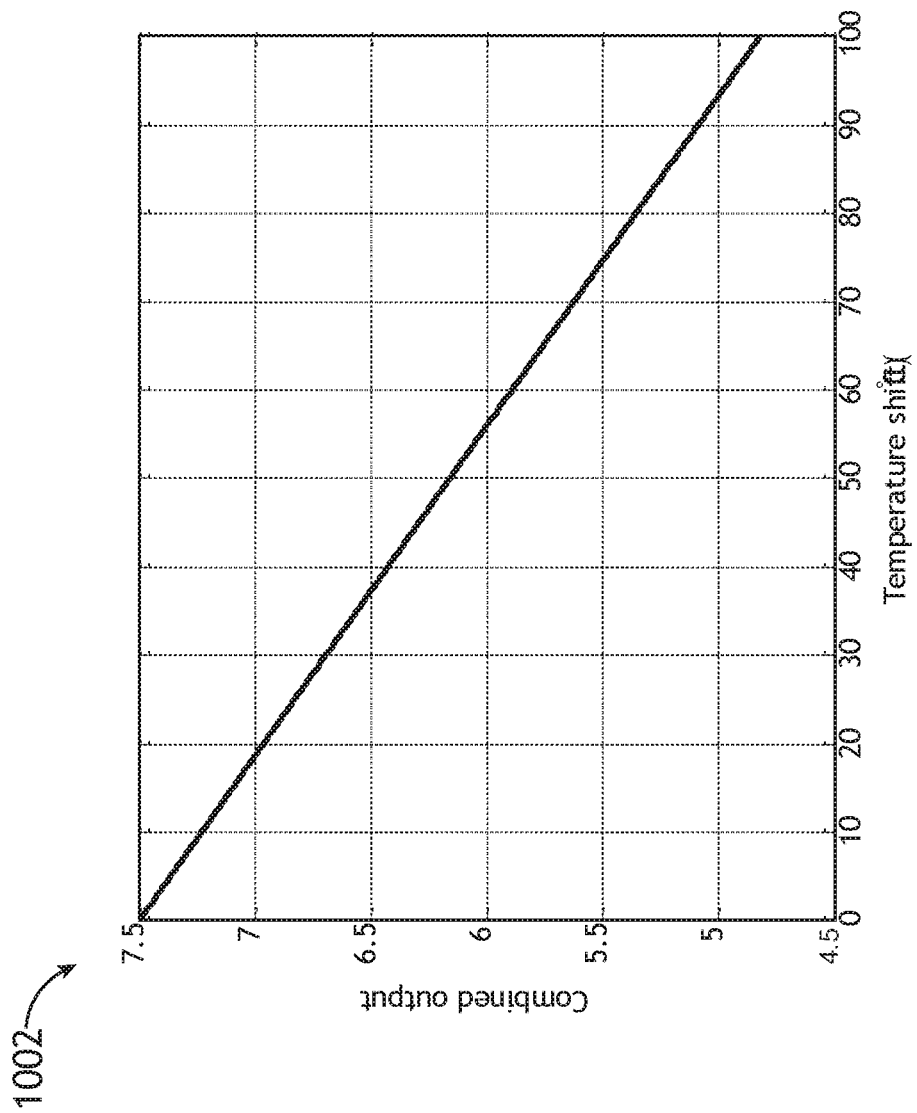
FIG. 10 is a plot illustrating a combined output signal as a function of temperature based on the two-stage wavelength detection system in FIG. 9 in accordance with an embodiment of the inventive concepts disclosed herein.

Referring now to FIGS. 9 and 10, the impact of a shift in temperature on a two-stage wavelength detection system 100 is shown. FIG. 9 is a plot 902 of the arctangent signals (e.g., $\arctan(i_Q/i_I)$) associated with FIG. 7 as a function of temperature in accordance with an embodiment of the inventive concepts disclosed herein. FIG. 10 is a plot 1002 illustrating a combined output signal as a function of temperature based on the two-stage wavelength detection system 100 in FIG. 9 in accordance with an embodiment of the inventive concepts disclosed herein. As illustrated in FIGS. 9 and 10, a shift in the temperature (e.g., from a nominal position) may result in a shift of the arctangent signal and thus the corresponding measurement of the wavelength of the input light 104.

The wavelength detection system 100 may be controlled and/or calibrated using any technique known in the art to account for the impact of temperature on the wavelength measurement. In some embodiments, the wavelength detection system 100 includes a temperature controller to actively control the temperature of one or more components to prevent temperature drifts. For example, components of the wavelength detection system 100 such as, but not limited to, one or more wavelength detection stages 102 (or portions thereof) may be mounted on a temperature-controlled thermally conductive material. In some embodiments, one or more components of the wavelength detection system 100 are formed from materials that are thermally stable (e.g., within an expected temperature range) to minimize the impact of any temperature fluctuations on the wavelength measurement. In some embodiments, the wavelength detection system 100 includes a calibration stage to monitor and account for temperature fluctuations. For example, the wavelength detection system 100 may include a calibration light source having a known fixed wavelength and one or more calibration wavelength detection stages (e.g., wavelength detection stages 102). In this regard, any changes in the arctangent signal of the calibration wavelength detection stages may be indicative of a temperature variation in the wavelength detection system 100. Further, the magnitude and/or direction of the shift of the arctangent signal of the calibration wavelength detection stages may be used to adjust and/or calibrate the wavelength measurement provided by the wavelength detection system 100.

Figure 11:
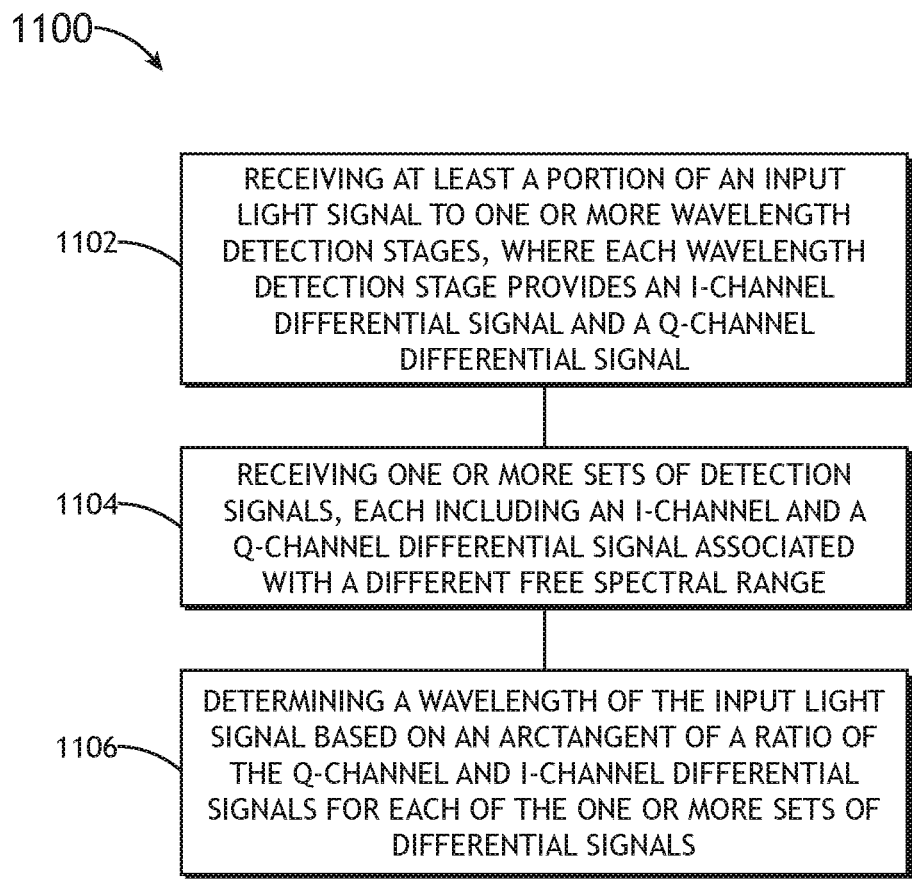
FIG. 11 is a block diagram illustrating an exemplary embodiment of a method according to the inventive concepts disclosed herein.

Referring now to FIG. 11, an exemplary embodiment of a method 1100 according to the inventive concepts disclosed herein may include one or more of the following steps. The method 1100 may be utilized to provide wavelength detection. The embodiments and enabling technologies described previously herein in the context of the wavelength detection system 100 should be interpreted to extend to method 1100. However, the method 1100 is not limited to the architecture of the wavelength detection system 100.

A step 1102 may include receiving at least a portion of an input light beam to one or more wavelength detection stages, where each wavelength detection stage provides an I-channel differential signal and a Q-channel differential signal. For example, each wavelength detection stage may be, but is not required to be, formed from an unbalanced interferometer 202, a 90-degree optical hybrid 402, and balanced photodiodes 218 to generate the I-channel and Q-channel signals as illustrated in FIGS. 4A and 4B. Further, a free spectral range may be associated with an optical path length difference between two arms of the unbalanced interferometer of each wavelength detection stage (or configuration thereof). A step 1104 may include receiving (e.g., with a logic device 106) one or more sets of detection signals, where each set of detection signals includes an !-channel and a Q-channel differential signal associated with a different free spectral range. A step 1106 may include determining a wavelength of the input light based on an arctangent of a ratio of the respective Q-channel and I-channel differential signals for each of the one or more sets of detection signals.

The one or more sets of detection signals associated with different free spectral ranges may be generated either simultaneously or sequentially. For example, at least one wavelength detection stage may have an unbalanced interferometer with a fixed optical path difference between the two arms and thus a fixed FSR. In this regard, multiple detection signals may be simultaneously generated by multiple wavelength detection stages operating in parallel. By way of another example, at least one wavelength detection stage may have an adjustable optical path delay to selectively control the optical path difference between the two arms and thus control the FSR. In this regard, multiple detection signals may be sequentially generated by a single wavelength detection stage.

Further, the detection signals associated with multiple FSRs may be combined to provide wavelength detection with a desired resolution over a desired operational wavelength range.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A wavelength detection system comprising:
   one or more wavelength detection stages configured to receive at least a portion of an input light signal, wherein each wavelength detection stage comprises:
      a splitter to split a portion of the input light signal into two arms, wherein a free spectral range associated with the respective wavelength detection stage is associated with an optical path length difference between the two arms, wherein each of the one or more wavelength detection stages has a unique optical path length difference to provide a unique free spectral range;
      a 90-degree optical hybrid configured to accept light from the two arms, where the 90-degree optical hybrid provides two in-phase channel outputs and two quadrature channel outputs; and
      two differential detectors configured to generate an I-channel differential signal based on a difference between light from the two in-phase channel outputs and generate a Q-channel differential signal based on a difference between light from the two quadrature channel outputs, wherein a wavelength of the input light signal is linearly proportional to an arctangent of a ratio of the Q-channel and I-channel differential signals within the free spectral range of each of the one or more wavelength detection stages; and
   a logic device communicatively coupled to the two differential detectors of each wavelength detection stage, wherein the logic device is configured to:
      receive one or more sets of detection signals, wherein each of the one or more sets of detection signals includes an I-channel differential signal and a Q-channel differential signal from one of the one or more wavelength detection stages; and
      determining a wavelength of the input light signal based on an arctangent of a ratio of the Q-channel and I-channel differential signals for each of one or more sets of detection signals.

2. The wavelength detection system of claim 1, wherein at least one of the one or more wavelength detection stages includes an adjustable optical delay line in at least one of the two arms to selectively adjust the respective free spectral range.

3. The wavelength detection system of claim 2, wherein the adjustable optical delay line comprises:
   an optical phase modulator.

4. The wavelength detection system of claim 2, wherein the adjustable optical delay line comprises:
   one or more optical switches configured to selectively direct light into any of two or more paths having different path lengths; and
   one or more couplers to direct light from any of the two or more paths to a common path.

5. The wavelength detection system of claim 1, wherein the one or more sets of detection signals comprise:

a first set of detection signals associated with a first free spectral range; and a second set of detection signals associated with a second free spectral range larger than the first free spectral range.

6. The wavelength detection system of claim 5, wherein determining the wavelength of the input light signal comprises:

determining a course-resolution measurement of the wavelength of the input beam based on an arctangent of a ratio of the Q-channel and I-channel differential signals associated with the second free spectral range; and determining a fine-resolution measurement of the wavelength of the input beam based on an arctangent of a ratio of the Q-channel and I-channel differential signals associated with the first free spectral range and the course-resolution measurement.

7. The wavelength detection system of claim 5, wherein the second free spectral range is an integer multiple (N) of the first free spectral range, wherein determining the wavelength of the input light signal comprises:

calculating a combined output, $O_c$, where $O_c$=floor$(N \cdot O_2)+O_1$, $O_1$ is an arctangent of a ratio of the Q-channel and I-channel differential signals associated with the first free spectral range, and $O_2$ is an arctangent of a ratio of the Q-channel and I-channel differential signals associated with the second free spectral range; and determining the wavelength of the input light signal based on the combined output.

8. The wavelength detection system of claim 1, wherein the 90-degree optical hybrid of a particular wavelength detection stage comprises:

a first-arm splitter to split light from the first arm into a first path and a second path;

a second-arm splitter to split light from the second arm into a third path and a fourth path;

a phase delay to introduce a 90-degree phase shift to light in the second path;

a first coupler to receive light from the first and third paths, wherein outputs of the first coupler form the two in-phase channel outputs; and a second coupler to receive light from the second and fourth paths, wherein outputs of the second coupler form the two quadrature channel outputs.

9. The wavelength detection system of claim 1, wherein the logic device comprises:

a field-programmable gate array device.

10. The wavelength detection system of claim 1, wherein the logic device comprises:

a controller including one or more processors.

11. The wavelength detection system of claim 10, wherein the controller comprises:

a digital signal processor.

12. A wavelength detection method comprising:

receiving at least a portion of an input light signal to one or more wavelength detection stages, wherein each wavelength detection stage comprises:

a splitter to split a portion of the input light signal into two arms, wherein a free spectral range associated with the respective wavelength detection stage is associated with an optical path length difference between the two arms, wherein each of the one or more wavelength detection stages has a unique optical path length difference to provide a unique free spectral range;

a 90-degree optical hybrid configured to accept light from the two arms, where the 90-degree optical hybrid provides two in-phase channel outputs and two quadrature channel outputs; and two differential detectors configured to generate an I-channel differential signal based on a difference between detected light from the two in-phase channel outputs and generate a Q-channel differential signal based on a difference between detected light from the two quadrature channel outputs, wherein a wavelength of the input light signal is linearly proportional to an arctangent of a ratio of the Q-channel and I-channel differential signals within the free spectral range of each of the one or more wavelength detection stages; and receiving, with a logic device, one or more sets of detection signals, wherein each of the one or more sets of detection signals includes an I-channel differential signal and a Q-channel differential signal from one of the one or more wavelength detection stages; and determining a wavelength of the input light signal based on an arctangent of a ratio of the Q-channel and I-channel differential signals for each of one or more sets of detection signals.

13. The wavelength detection method of claim 12, wherein at least one of the one or more wavelength detection stages includes an adjustable optical delay line in at least one of the two arms to selectively adjust the respective free spectral range.

14. The wavelength detection method of claim 12, wherein receiving, with a logic device, one or more sets of detection signals comprises:

receiving a first set of detection signals associated with a first free spectral range; and receiving a second set of detection signals associated with a second free spectral range larger than the first free spectral range.

15. The wavelength detection method of claim 14, wherein determining the wavelength of the input light signal comprises:

determining a course-resolution measurement of the wavelength of the input beam based on an arctangent of a ratio of the Q-channel and I-channel differential signals associated with the second free spectral range; and determining a fine-resolution measurement of the wavelength of the input beam based on an arctangent of a ratio of the Q-channel and I-channel differential signals associated with the first free spectral range and the course-resolution measurement.

* * * * *